United States Patent [19]

Schoenrock et al.

[11] 4,412,866
[45] Nov. 1, 1983

[54] METHOD AND APPARATUS FOR THE SORPTION AND SEPARATION OF DISSOLVED CONSTITUENTS

[75] Inventors: Karlheinz W. R. Schoenrock, Ogden, Utah; Michael M. Kearney; D. Eugene Rearick, both of Twin Falls, Id.

[73] Assignee: The Amalgamated Sugar Company, Ogden, Utah

[21] Appl. No.: 267,065

[22] Filed: May 26, 1981

[51] Int. Cl.³ .......................... C13K 3/00; C13D 3/14
[52] U.S. Cl. .................................. 127/46.2; 210/656; 210/662; 210/676; 210/739; 210/741
[58] Field of Search .............. 127/46.2; 210/662, 675, 210/676, 678, 741, 791–795, 137, 416.1, 670, 739, 656; 55/344, 350

[56] References Cited

U.S. PATENT DOCUMENTS

| | | | |
|---|---|---|---|
| 2,985,589 | 5/1961 | Broughton | 210/676 |
| 3,231,492 | 1/1966 | Stine | 210/676 |
| 3,268,605 | 8/1966 | Boyd | 210/676 |
| 3,706,812 | 12/1972 | Derosset | 210/791 |
| 3,777,888 | 12/1973 | Zellbeck | 210/416.1 |
| 3,779,384 | 12/1973 | Stahlkopf | 210/137 |
| 4,001,113 | 1/1977 | Schoenrock | 210/678 |
| 4,085,042 | 4/1978 | Misumi | 210/678 |
| 4,157,267 | 6/1979 | Odawara | 127/46.2 |
| 4,182,633 | 1/1980 | Ishikawa | 127/46.2 |
| 4,269,715 | 5/1981 | Barraque | 210/678 |

*Primary Examiner*—Ernest G. Therkorn
*Attorney, Agent, or Firm*—Trask & Britt

[57] ABSTRACT

A simulated moving bed process divides the bed into separate zones, each of which includes one or more discrete vessels. The zones correspond to the functions of the process; typically sorption, displacement, elution and regeneration. Booster pumps in series with the vessels maintain a desired pressure head for each zone. The functions of each zone are rotated in sequence, the sequence being timed in relation to the migration of the front between adjacent phases in the fluid loop circulating through the zones.

15 Claims, 3 Drawing Figures

METHOD AND APPARATUS FOR THE SORPTION AND SEPARATION OF DISSOLVED CONSTITUENTS

BACKGROUND OF THE INVENTION

1. Field

This invention relates to ion exchange separation. It is specifically directed to such a process conducted in a simulated moving bed of sorbents.

2. State of the Art

Ion exchange systems which involve the passing of liquids containing at least two components through an ion exchanger are well known. Such processes are sometimes referred to as adsorber systems, and the process whereby one dissolved constituent is separated from another dissolved constituent by passage through an ion exchanger or adsorber bed is sometimes referred to as "adsorbtive separation". These processes generally involve passing a solution through a bed of resin, whereby one constituent is attracted to the resin bed, followed by an elution, or regeneration, step. The elution step removes the adsorbed constituent from the resin as "extract." The solution from which the adsorbed constituent has been removed is referred to as "raffinate," or sometimes "ashes". A common procedure is to contact the adsorber bed (ion exchange resin) alternately with the feed stock (solution of constituents) and eluant, respectively, to achieve this separation. The feed stock and eluant may flow in either co-current or counter-current relationship through a stationary bed. Use of a stationary bed has limited ion exchange separations to batch operation.

Efforts have been made to conduct ion exchange processes in a fashion which simulates the characteristics of a continuous operation. One such approach has been physically to move the exchange resin, either continuously or by periodic pulsing, from one zone to another zone. Each zone is then operated continuously, either in an adsorber (or loading) cycle, or an elution (or de-sorbing) cycle. Mechanical wear, such as that caused by friction on the individual particles of resin, has been destructive. Accordingly, processes involving the physical movement of the ion exchange resin have not gained wide acceptance.

U.S. Pat. No. 2,985,589 (Broughton et al) discloses a continuous sorption process employing a stationary or fixed bed in a fashion which simulates a moving bed. Stationary bed operated by such procedures are commonly referred to as "psuedo-moving beds," or more often, as "simulated moving bed". A more recent patent disclosing a simulated moving bed process in U.S. Pat. No. 4,182,633 (Ishikawa et al).

The simulated moving bed of the prior art generally is constructed as a single column partitioned into a plurality of individual compartments. These individual compartments may be regarded as zones, connected in series with an inlet at the top of each zone and an outlet at its bottom. The process is regarded as continuous because a continuous circulation flow is maintained through the zones in series, being collected at the bottom of the last zone in the series, after having percolated through each of the zones beginning with the zone at the top of the column. The collected liquid is re-introduced at the top of the column to the first zone of the series for recirculation. The inlets and outlets of each zone in the system are connected by means of an exterior manifold with appropriate valving to selectively introduce feed stock or eluant to the top of any zone, and to withdraw raffinate or extract from the bottom of any appropriate zone. Each zone may thus function in turn as the sorption zone, the displacement zone, the elution zone and the rinse (or regeneration) zone. The function of the zone is established by the nature of the medium which is either entering or leaving the zone at any particular moment.

It is an important objective in the operation of a simulated bed to maintain well defined interfaces between the various phases flowing through the system. Although the zones are ordinarily treated in batch fashion, the interface between adjacent phases progresses through the system continuously. For this reason, it is important to know or be able to predict when the front of the raffinate phase or extract phase has moved to the proximity of an outlet associated with one of the zones. The arrival of the front at an outlet should correlate with the opening of the manifold valve associated with that outlet and the closing of the outlet valves of the other zones. Opening of the appropriate outlet manifold valves must be coordinated with the opening of inlet valves for the introduction of feed stock and eluant to the tops of the appropriate zones within the system. Introduction of these liquids is desirably done in a fashion which maintains an undisturbed interface between the liquid phases flowing through the column. Various expedients are known for this purpose. For example, liquids may be introduced through various distributor systems which inject liquid across substantially the entire cross-section of the vessel. It is also known to withdraw fluids from an outlet through a similar distribution system.

The simulated moving bed processes which have evolved suffer from a number of inherent shortcomings. For example, the use of a bed of ion exchange resin always requires periodic backwashing of the sorbent material, both for the removal of fines and to loosen the bed. After a period of operation, the inevitable compaction of the resin causes an intolerable pressure drop across the bed. A compacted bed impedes the percolation of liquid through the column. Moreover, it is important that the beds confined within each zone of a column be classified periodically into layers of equal particle size. Otherwise, it is impractical to maintain approximately equivalent conditions within each zone. It is also important periodically to remove entrained gas pockets within the bed, because they tend to disturb the desired even cross-sectional fluid flow through the bed. It is not practical to backwash the beds confined within individual zones individually. Accordingly, it is difficult to maintain optimum flow conditions through the bed. When backwashing becomes critically important, the entire bed must be removed from the column and replaced.

U.S. Pat. No. 4,001,113 discloses an ion exchange treating system in which two or more exchangers or adsorber vessels are connected in series, and each vessel is filled with ion exchange resin leaving sufficient free board to allow for expansion of the medium. The process disclosed does not involve a simulated moving bed. Each vessel is provided with an expansion chamber positioned directly above it to accept resin during backwashing procedures. Each vessel is also provided with distribution systems at the top and bottom for the introduction or withdrawal of liquids.

For optimum efficiency and excellent chromatographic separation within an ion exchange column, the sorbent bed should be as high as is practical. That is, the flow path through the zone is desirably long. Placement of a plurality of zones within a column imposes a cumulative pressure drop on the system which inevitably restricts the practical height permitted for each of the beds within the several zones of the column.

Successful operation of a simulated moving bed process depends upon the maintenance of steady state equilibrium, as reflected by the absence of drift in the concentration gradient of the various components to be separated and in the fractions collected from the circulating loop. As previously indicated, it is important to maintain well defined fronts for the various phases flowing through the column. It is also important reliably to predict the progress of these fronts through the column. This prediction is correlated both to the establishment of a circulation flow rate within the loop and to the timing of shifting the opening and closing of the inlet and outlet ports connected to the manifold system. Heretofore, establishing both the circulation flow rate and the timing of the manifold flow control have been based upon either trial and error or involved measurements of component concentrations. The aforementioned U.S. Pat. No. 4,182,633 discloses one approach to controlling a simulated moving bed process which involves measurements and rather complex computations.

It is characteristic of simulated moving bed processes that the volumes of the streams (feed stock and eluant) entering the circulating loop do not precisely equal the volumes of the streams (extract and raffinate) leaving the circulating loop. Moreover, the total pressure drop through the column is the sum of a pressure drop through the various zones, each of which can vary significantly. This total pressure drop must be balanced against the pressure generated by a recirculation pump required by the system to transfer the circulating stream collected at the bottom of the column back to the top of the column. All of these factors make it extremely difficult to maintain pressure integrity within the loop and to differentiate the causes of any pressure imbalance within the loop.

Simulated moving bed processes may utilize adsorbents or exchangers selected from any of the known compounds or classes of compounds known to the art. The resin beds may be either organic or inorganic in nature, having functionality either as an ion exchanger or adsorber. The dissolved constituents which may be separated by simulated moving bed techniques also include either organic or inorganic constituents dissolved in a medium which is most commonly liquid, but could conceivably be gaseous. The ideal application of a simulated moving bed process is to separate constituents which are similar in chemical and physical nature. Accordingly, they are of special usefulness in separating compounds such as glucose and fructose from an aqueous invert sugar solution or fructose from a solution which also contains starch hydrolysates.

SUMMARY OF THE INVENTION

This invention comprises a simulated moving bed method and apparatus which avoids the problems previously enumerated. The apparatus comprises a series of individual vessels, each of which functions as a zone within a loop of recycling liquid medium. The apparatus ordinarily includes a minimum of four separate vessels corresponding to the four media usually accommodated by the process; namely, feed stock, eluant, extract, and raffinate. That is, the zones may be identified as the sorption zone, the displacement zone, the elution zone, and the rinse or regeneration zone. Each zone serves each function in sequence as the process proceeds in steps. Progress from one step to the next is coordinated to the migration of the fronts between phases within the circulating liquid. Any of the zones may include more than one vessel, but ordinarily the total number of vessels in a loop will be a multiple of four, with an equivalent volume of exchanger or absorbent contained within each zone. It should be understood that the invention is readily adapted to processes accommodating a different number of media. In general, the minimum number of discrete vessels in the system; i.e., the number of zones in the system, should equal the total number of streams introduced and withdrawn from the system.

Ideally, a fluid dome is maintained at the top of each vessel, a distributor apparatus is positioned within the vessel at the interface between this fluid dome and the medium contained within that vessel. Thus, any of the aforementioned four liquid streams introduced to a vessel enters through the distributor just below the fluid dome, thereby maintaining a sharp interface between the dome above and the liquid stream entering the vessel below the dome but preferably above the compacted sorbent bed. A second distributor apparatus is installed at the bottom of each vessel to withdraw liquids uniformly across the cross-sectional area of the compacted bed contained by the vessel.

The fluid dome most often used in the processes of specific interest to this disclosure consists of water. It should be understood, however, that any liquid or gas which is compatible with the medium in the zone and floats on that medium could be used. The fluid used as the eluant in the process will usually be a suitable dome material.

The top and bottom distributors of all of the vessels are connected by a manifold system through valves so that the inlets may selectively be opened or closed to the introduction of either feed stock solution or eluant liquid and the outlets of any vessel may selectively be opened or closed to piping arranged for the withdrawal of extract or raffinate fractions. Without regard to the aforementioned valving and manifold system, the inlet of each vessel in the loop is connected to the outlet of a preceding vessel so that a continuous circulation of liquid is maintained through all of the vessels in the system. A front develops between a phase comprising the remnants of the feed solution containing the non-separated component (raffinate) and the eluant. Ideally, this front is kept as sharp as possible, but in practice, the phases will mingle somewhat at their interface. For control purposes, the front is regarded as the portion of the circulating liquid in which the composition changes rapidly from that of the raffinate to that of the eluant. Circulation pressure is maintained substantially constant through the use of booster pumps between vessels in the loop. The flow rate of the recycling medium, and thus the migration rate of the front, is controlled by means of one or more valves located strategically within the loop. Ordinarily, adequate control may be maintained with a single such valve located proximate the inlet to one of the vessels.

In its preferred embodiments, each of the vessels is provided with a port at its top which communicates through valving to an expansion chamber. When water is used as the eluant, the eluant may be introduced into the vessels through this top port, (rather than a distributor), thereby displacing the water dome in addition to the liquid medium located beneath the distributor. In this way, a fresh water dome is maintained above the distributor. The expansion chamber functions as a receiver for backwashed compacted sorbent bed so that the bed of each vessel may be periodically fluidized and reclassified. This arrangement avoids the inconveniences attendant to maintaining the bed in a tall column. Several zone vessels may communicate with a single expansion chamber.

According to this invention, timing of the changes in function of each zone in the process may be coordinated to the arrival of the front of the non-separated component to reference locations in the loop. Ideally, reference locations are designated with respect to the outlets of each zone in the loop, and the function of all of the zones is advanced one step when this front migrates to approximately the next succeeding reference location in the loop.

BRIEF DESCRIPTION OF THE DRAWINGS

In the drawings, which illustrate that which is presently regarded as the best mode for carrying out the invention.

DESCRIPTION OF THE ILLUSTRATED EMBODIMENTS

Figure 1:
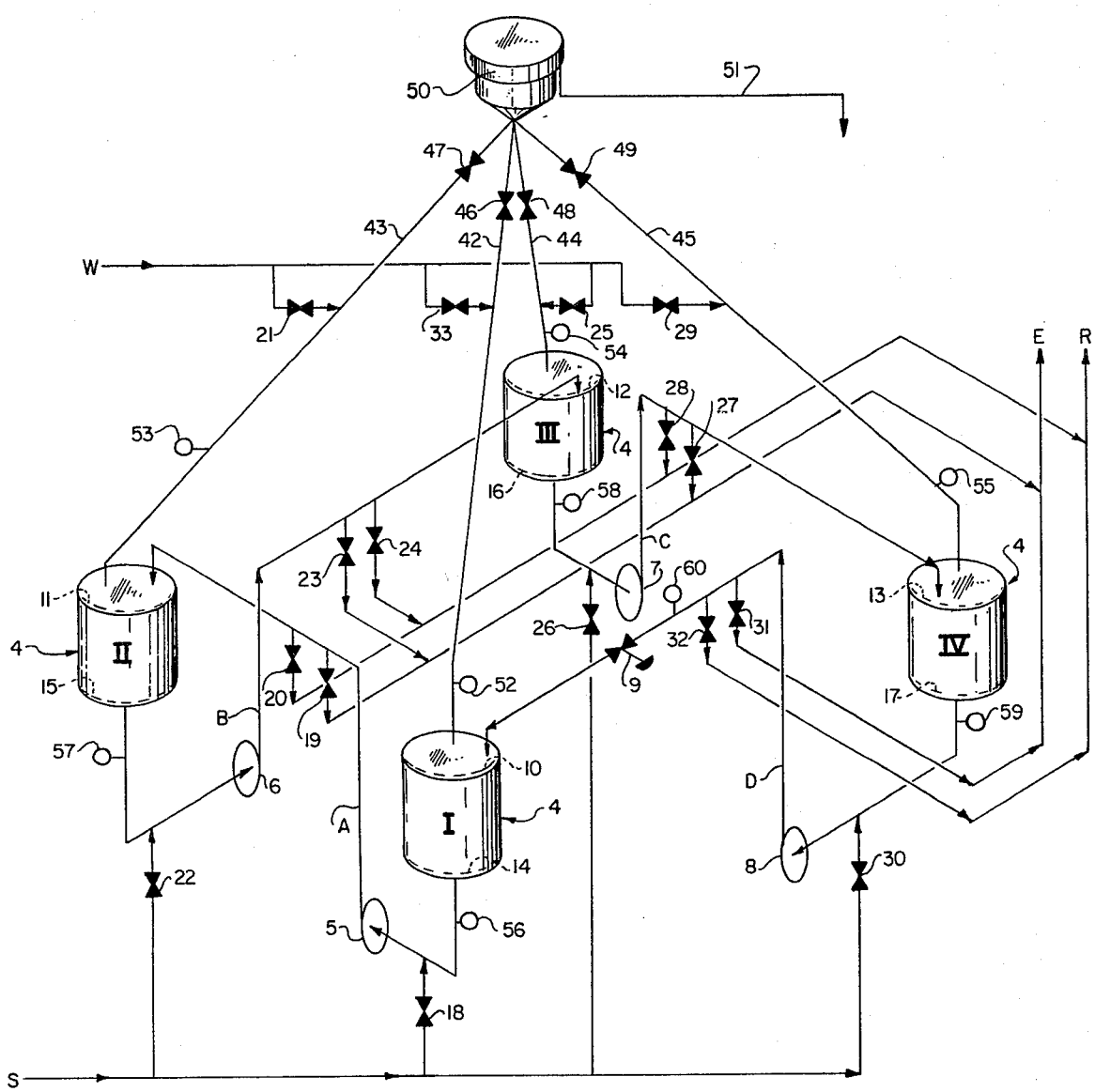
FIG. 1 is a schematic partially pictorial illustration of four zone vessels and an expansion chamber interconnected in accordance with one embodiment of this invention.
Figure 2:
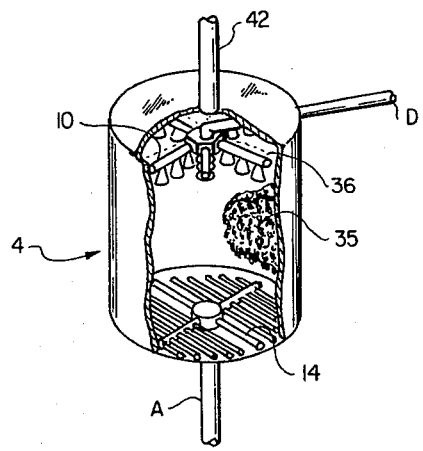
FIG. 2 is a pictorial view, partially broken away, showing a typical zone vessel of this invention.
Figure 3:
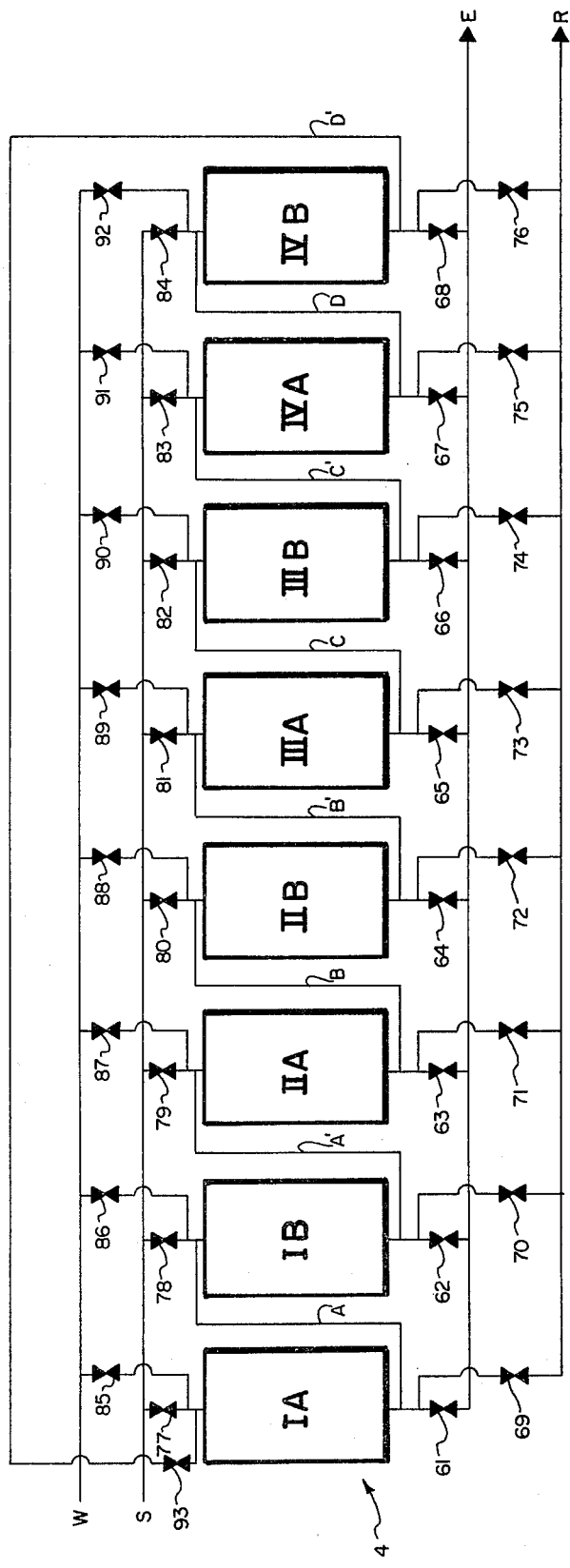
FIG. 3 is a schematic illustration of an alternative embodiment of this invention.

FIGS. 1 and 3 each illustrate embodiments of the invention including four equivalent reaction zones I, II, III and IV, each of which includes at least one discrete vessel 4, such as that shown in more detail by FIG. 2. The zones I, II, III and IV are connected in series with the outlet of each zone connected to an inlet of the next zone in the series. Thus, as shown by FIG. 1, the outlet of the vessel 4 comprising zone I is connected by a conduit A to the inlet at the top of the vessel 4 comprising zone II. A booster pump 5 is interposed in conduit A. In similar fashion, the other outlets and inlets of all of the zones I, II, III and IV are interconnected for series flow through the conduits B, C, D and booster pumps 6, 7, 8. A flow control valve 9 in the conduit D regulates the circulation rate of liquid through the loop comprising the zones I, II, III, IV, the conduits A, B, C, D and the pumps 5, 6, 7, 8. An important aspect of the invention is the determination of an appropriate circulation rate through the loop, and the maintenance and adjustment of this rate at critical stages of the process.

As best shown by FIG. 2, which for purposes of illustration is numbered as though it is the vessel 4 comprising zone I of FIG. 1, the inlet of each vessel 4 terminates in a feed distributor apparatus 10, 11, 12, 13, respectively, and the outlet of each vessel 4 originates as a withdrawal distributor apparatus, 14, 15, 16, 17, respectively. The approximate locations of the distributor devices are shown in phantom lines in FIG. 1. These devices are important for the maintenance of a uniform, non-turbulent flow of fluid from top to bottom of the vessel.

Referring to FIG. 1, a system of valves 18 through 33 may interconnect the conduits A, B, C, D of the circulation loop to a manifold system arranged to conduct the various media E, S, R and W accommodated by the process illustrated. For clarity, each manifold is identified to the medium it conducts. That is, the feed stream S is conducted through the S manifold, the eluant W is conducted through the W manifold, the extract E is conducted through the E manifold, and the raffinate R is conducted through the R manifold. The feed stream is designated S and the eluant stream is designated W because the process illustrated will be explained with reference to an inverted sugar solution feed stream and water eluant. That is, the raffinate R will include polysaccharides and glucose and the extract E is an aqueous solution of fructose. As illustrated by FIG. 1, the W manifold is not actually interconnected to the conduits A, B, C, D, although it could be (see FIG. 3). The use of a water dome, as will be explained, makes the arrangement illustrated by FIG. 1 desirable when water is used as the eluant.

The vessels 4 are packed with an appropriate bed 35 of absorber or resin, as best shown by FIG. 2. Desirably, the bed should substantially fill the vessel 4 from its bottom to at least near inlet distributor 10 when expanded. Room should be left above the distributor 10 for a water dome 36 to float above the medium entering the vessel 4 through the distributor 10. The entering medium thus spreads across the top of the bed 35 and then percolates down. For the separation of fructose from glucose in invert sugar solutions, a useful sorbent for the bed 35 consists of a strongly acidic, gel-type synthetic cationic exchanger in calcium form having a low percentage of cross-linking. The bed 35 should be completely immersed in the medium, and void of entrapped gas.

Because water dome 36 is illustrated, and because the use of water as the eluant is assumed, the valves 21, 25, 29 and 33 of the W manifold are shown interconnecting the tops of the vessels 4 of zones I, II, III, IV through pipes 42, 43, 44, 45. Thus, water introduced to a vessel 4, e.g., through pipe 42, displaces the water from dome 36 downward, thereby providing fresh water for the dome 36. The pipes 42, 43, 44, 45 are also connected through valves 46, 47, 48, 49, respectively, to an expansion chamber 50, with an overflow pipe 51. This arrangement permits periodic individual backwashing of each of the vessels 4 without disturbing any of the other vessels in any of the zones I, II, III, IV.

Pressure gauges 52, 53, 54, 55 are located in each of the water pipes 42, 43, 44, 45. Similar gauges 56, 57, 58, 59 are located at the outlets of each vessel 4 of zones I, II, III and IV. A similar gauge 60 is located upstream of valve 9 in the circulating loop. These gauges, or other pressure-sensing devices, are useful for maintaining the appropriate pressure balance throughout the system.

Assuming steady state operation of a system such as that illustrated by FIG. 1 applied to an invert sugar solution and using water domes 36 at the top of each vessel 4, a circulation flow is maintained through the loop by means of the pumps 5, 6, 7, 8, so that fluid percolates down through each bed 35 contained by each zone in series from I through IV and then back through flow control valve 9 to zone I for recirculation continuously through the zones in series. The valves 18 through 33 are then set to establish the following flow patterns: Invert sugar solution S is introduced to distributor 12 in zone III. Water W is simultaneously introduced into the top of zone I through pipe 42 to displace the water dome 36 and any sugar which may have migrated into it. Raffinate R is displaced through distributor 16 of zone III, while extract E is displaced from zone I through distributor 14. During this sequence, the front of the non-sorbed component continues to pass through zone IV because of the normal circulation flow established in the loop. When that front arrives in the conduit D, the valves 18 through 33 are reset approximately simultaneously to change the functions of each zone. Thus, the feed stream S is now introduced through the distributor 13 at the top of zone IV to displace raffinate R through distributor 17. Simultaneously, the introduction of water W is transferred through pipe 43 to the top of zone II to displace extract E through distributor 15. During this sequence, the front of the non-sorbed component migrates through zone I. When this front reaches conduit A, the valves 18 through 33 are again adjusted to shift the function of each zone; that is, water W is introduced to the top of zone III, and sugar solution S is introduced to the top of zone I. When the front of the non-sorbed component reaches conduit B, the valves 18 through 33 are once more adjusted so that water W is introduced to the top of zone IV and feedstock S is introduced to the top of zone II.

Table 1 correlates the timing of the four steps of the illustrated process with the location of the front of the non-sorbed component. This front corresponds to the interface between the raffinate phase and a nearly pure water phase. The table also indicates those valves of each manifold shown by FIG. 1 which are open during each step and identifies the media introduced to and withdrawn from the zones during each step.

TABLE 1

| Start Step | Raffinate Front Conduit Location | Manifold Valves Open (All Others Closed) | | | | Vessel Connections | | | |
|---|---|---|---|---|---|---|---|---|---|
| | | S | R | W | E | Input | | Output | |
| | | | | | | W | S | E | R |
| 1 | C | 22 | 28 | 33 | 19 | I | III | I | III |
| 2 | D | 26 | 32 | 21 | 23 | II | IV | II | IV |
| 3 | A | 30 | 20 | 25 | 27 | III | I | III | I |
| 4 | B | 18 | 24 | 29 | 31 | IV | II | IV | II |

As previously disclosed, valves 18 through 33 are desirably sequenced with reference to the movement of the front of the non-sorbed constituent through the loop. It is thus necessary to determine reliably when the non-sorbed component front arrives in the downstream conduit following any particular vessel in the loop. Various techniques are known for analyzing the composition of the liquid passing a particular point in the loop, but according to this invention, such techniques may be avoided entirely. The time when the non-sorbed component arrives in the downstream conduit following any vessel may be regulated without the need for making continuous measurement for this non-sorbed component. This regulation is accomplished by fixing the circulation flow rate through the loop and the cycling frequency of the manifold valves 18 through 33 according to Equation [1]:

$$\frac{LV}{S} = T \times F_L \quad [1]$$

where:
LV = liquid displacement volume in the loop.
S = number of stages, or individual vessels, in the loop.
T = the cycling frequency.
$F_L$ = the flow rate for the non-sorbed component.

If, for example, the total liquid displacement volume in the loop is 60 cubic meters, the loop includes four vessels, and a cycling frequency of 15 minutes is selected, the recirculation flow rate through the loop is calculated by Equation [1] to be:

$$\frac{60}{4 \times 15} = F_L = 1 \text{ cubic meter per minute.}$$

The loading of each separator bed within the loop may be varied by changing the cycling frequency. Within practical limits, loading increases with increasing cycle lengths and decreases with reduced cycle lengths. Once a cycling frequency is established, the appropriate circulating flow rate is determined by Equation [1].

The circulation flow rate thus established pertains only to the movement of the non-sorbed component front. This front advances through the entire loop as the system is sequenced through the steps 1 through 4 described with reference to Table 1. It is within contemplation to place a flow control valve in each of the conduits A, B, C, and D, and to regulate the circulation flow rate by means of that valve which is at any time passing the non-sorbed component front. Adequate control is provided by a single such flow control valve 9, however, provided the influence of varying compositions of the different phases of the circulating liquid is taken into account. Referring again to the system of Table 1, suitable adjustments may be made to the circulation flow rate at valve 9 as the inflow (S, W) and outflow (E, R) streams of the loop change their respective positions in the loop, as follows:

TABLE 2

| Cycling Position | Circulation Flow Rate At Valve 9 (FIG. 1) |
|---|---|
| Step 1 | $F_L$ |
| Step 2 | $F_L$ |
| Step 3 | $F_L + F_R$ |
| Step 4 | $F_L + F_R - F_S$ | where:
$F_L$ = basic circulation flow, as determined by Equation [1].
$F_R$ = flow rate of the non-sorbed component fraction (raffinate) leaving the loop.
$F_S$ = flow rate of the feed stream entering the loop.

For a loop identical to the previous example except including eight vessels (vessels A and B in each of zones I, II, III and IV as in FIG. 3), the basic circulation flow rate is derived from Equation [1] as follows:

$$\frac{60}{8 \times 15} = 0.5 \text{ cubic feet per minute}$$

Such a system includes eight steps with inlets and outlets connected through manifold valves as tabulated in Table 3.

TABLE 3

| Start Step | Raffinate Front Conduit Location | Manifold Valves Open (All Others Closed) | | | | Vessel Connections | | | |
|---|---|---|---|---|---|---|---|---|---|
| | | S | R | W | E | Input W | S | E | Output R |
| 1 | C  | 82 | 75 | 86 | 63 | IB   | IIIB | IIA  | IVA  |
| 2 | C' | 83 | 76 | 87 | 64 | IIA  | IVA  | IIB  | IVB  |
| 3 | D  | 84 | 69 | 88 | 65 | IIB  | IVB  | IIIA | IA   |
| 4 | D' | 77 | 70 | 89 | 66 | IIIA | IA   | IIIB | IB   |
| 5 | A  | 78 | 71 | 90 | 67 | IIIB | IB   | IVA  | IIA  |
| 6 | A' | 79 | 72 | 91 | 68 | IVA  | IIA  | IVB  | IIB  |
| 7 | B  | 80 | 73 | 92 | 61 | IVB  | IIB  | IA   | IIIA |
| 8 | B' | 81 | 74 | 85 | 62 | IA   | IIIA | IB   | IIIB |

For a system with a flow control valve 93 only between vessels IVB and IA, as shown by FIG. 3, adjustments to the circulation flow rate in the loop as set forth in Table 4 would be appropriate. Of course, substantially equivalent circulation flow rate adjustments may be effected with reference to the other flow parameters of the system in arrangements other than those set forth in Table 4.

TABLE 4

| Cycling Position | Circulation Flow Rate At Valve 90 (FIG. 3) |
|---|---|
| Step 1 | $F_L$ |
| Step 2 | $F_L$ |
| Step 3 | $F_L + F_R$ |
| Step 4 | $F_L + F_R$ |
| Step 5 | $F_L + F_R - F_S$ |
| Step 6 | $F_L + F_R - F_S$ |
| Step 7 | $F_L + F_W$ |
| Step 8 | $F_L$ | where: $F_W$ denotes the flow rate for the desorbent entering the loop.

In operation, fluctuations in the viscosities and densities of the various media in the system are to be expected. Accurate measurements of the flow rates of the five streams (feed, eluant, extract, raffinate, circulating loop) in the system is important to maintain adequate hydraulic balance. A convenient reference flow, the one used throughout this disclosure, is that of the feed stream, i.e., $F_S$. The eluant flow rate, $F_W$ may then be regarded as a variable dependent upon $F_S$. That is, a change in $F_S$ may effect a corresponding change in $F_W$. It is often advantageous to treat the raffinate flow $F_R$ and the extract flow $F_E$ as a single combined flow $F_I$ equal to the total inflow $(F_S+F_W)$. Changes in the ratio of $F_R$ to $F_E$ is a valuable parameter, imparting on the efficiency of the process, the purity of the extract, overall dilution and the shift of the dilution inevitable in the system to either the extract or raffinate fraction.

Assuming an invert sugar feed and water as the eluant, Table 5 reports typical ranges and a specific example:

TABLE 5

| Parameter | Typical Range | Typical Example |
|---|---|---|
| $F_S$ | 25–100 gal./min. | 50 gal./min. |
| $F_W:F_S$ | 0.7–2.0 | 0.9 |
| $F_W$ | 25–150 gal./min. | 55.6 gal./min. |
| $F_E:F_R$ | 0.3–1.3 | 0.5 |
| $F_E$ | $(F_S + F_W - F_R)$ | 35.2 |
| $F_R$ | $(F_S + F_W - F_E)$ | 70.4 |

Maintaining the appropriate circulation flow rates in the loop as described will assure steady state operation without a drift in the composition of either the non-sorbed component or the de-sorbed component in the various fractions leaving the loop.

Referring again to FIG. 1, adjusting the pressure difference across the circulation control valve 9 constitutes a reliable means for balancing the pressure generated by the circulation pumps 5, 6, 7, 8 against the pressure drop through the whole loop. An increase of this pressure drop across the circulation flow control valve, as detected by pressure sensing devices 52 and 60 beyond a predetermined range indicates excessive circulation pump capacity. The internally-generated pressure is thus adjusted by means appropriate for the design of the pumps 5, 6, 7, 8 in the system. If centrifugal pumps are used, the drive on one or more of the pumps may be stopped to allow free passage through those pumps without a build-up of pressure. The drive speed may simply be reduced if the circulating pumps are equipped with variable speed drives. A pressure drop across the circulation flow control valve 9 below a predetermined range indicates that the compaction of the sorbed bed has increased to a point requiring either that the bed be loosened by backwashing, or that additional recirculation booster pump capacity be initiated. Appropriate adjustments should be made to balance the internally-generated pressure within the loops against the total pressure drop in the loop according to Formula [2]:

$$\Sigma P_G - \Sigma \Delta P = 0 \qquad [2]$$

where:
$\Sigma P_G$ = total generated pressure within the loop.
$\Sigma \Delta P$ = total pressure drop in the loop.

These pressure drops are readily determinable from the devices 52 through 60.

Any abnormal pressure conditions remaining after the total internally-generated pressure has been balanced against the total pressure drop in the loop is presumed to be caused by a hydraulic imbalance between the inflow and outflow streams, and is reflected by an increase or decrease in the outflow stream leaving the loop. This abnormal residual pressure can be measured at the suction side of each of the circulation pumps 5, 6, 7, 8, and is allowed to float within a range which disallows either a build-up of pressure within the loop beyond safe operation, or development of a negative pressure which could result in flashing of the solvent within the beds or cavitation of the pumps.

One approach is to detect only the lowest pressure in the loop, but the presently preferred approach is to sum all suction side pump pressures and to maintain the sum within a prescribed range (e.g., 150 to 300 psi) by selectively increasing or decreasing the appropriate flows. For example, the summed pressure is increased by either increasing the inflow or decreasing the outflow to the system.

Control of pressure balances and hydraulic balances in systems, such as illustrated by FIG. 3, with more vessels is analogous to that described in connection with FIG. 1. That is, in general, the internally generated pressure detected in the circulation loop should be balanced with total pressure drop in the loop, and the residual pressures measured at the suction side of the circulation pumps (particularly the one receiving the feed stream S) should be monitored and controlled to avoid developing an unsafe circulation pressure.

The use of booster pumps in circuit between individual vessels is an important feature of the process. These pumps are used to provide the desired pressure head to each zone in the loop, thereby permitting a much greater total bed depth in the loop.

Reference herein to details of the illustrated embodiments is not intended to restrict the scope of the appended claims, which themselves set forth those details regarded as essential to the invention.

We claim:

1. A simulated moving bed process for recovering a separated component from a feed solution containing said separated component and a non-separated component, comprising:

providing a bed of separating medium for said separated component divided into four zones, each including at least one discrete vessel, containing a portion of said bed with an inlet at one end of said portion and an outlet at the opposite end of said portion, said zones being serially designated I, II, III and IV, respectively, and arranged in a loop for series flow by connection of the outlet of each zone to the inlet of the next succeeding zone of the series, the outlet of zone IV being connected to the inlet of zone I;

filling the zones with liquid so that the entire bed is immersed and substantially free from entrapped gas;

circulating liquid through the entire bed in a circulation loop through said zones with pump means located within said loop, and while maintaining said circulation, introducing feed solution to zone II, thereby displacing a raffinate fraction from said zone for recovery from said bed and creating a front of non-separated component which migrates with the circulation flow through zone IV; and approximately simultaneously introducing eluant to zone I, thereby displacing an extract fraction from said zone for recovery from said bed;

continuing said introductions to and withdrawals from zones III and I until said front of non-separated component migrates to approximately a first reference location in the loop, with respect to the outlet of zone IV; and then introducing feed solution to zone IV, thereby displacing a raffinate fraction from said zone IV for recovery from said bed; and approximately simultaneously introducing eluant to zone II, thereby displacing an extract fraction from said zone II for recovery from said bed;

continuing said introductions to and withdrawals from zones IV and II until said front of non-separated component migrates to approximately a second reference location in the loop with respect to the outlet of zone I; and then introducing feed solution to zone I, thereby displacing a raffinate fraction from said zone I for recovery from said bed; and approximately simultaneously introducing eluant to zone III, thereby displacing an extract fraction from said zone III for recovery from said bed;

continuing said introductions to and withdrawals from zones I and III until said front of non-separated component migrates to approximately a third reference location in the loop with respect to the outlet of zone II; and then introducing feed solution to zone II, thereby displacing a raffinate fraction from said zone II for recovery from said bed; and approximately simultaneously introducing eluant to zone IV, thereby displacing an extract fraction from said zone IV for recovery from said bed;

continuing said introductions to and withdrawals from zones II and IV until said front of non-separated component migrates to approximately a fourth reference location in the loop with respect to the outlet of zone III; and thereafter repeating the aforedescribed sequence of introductions of feed solution and eluant, respectively, and corresponding withdrawals of raffinate and extract, respectively, in coordination with the migration of said front through the loop to the proximities of said first, second, third and fourth reference locations.

2. A process according to claim 1 wherein the feed solution is an invert sugar solution, the separated component is fructose, the non-separated component comprises the remaining constituents of the inverted sugar solution, and the eluant is water.

3. A process according to claim 1 wherein each zone includes at least two discrete vessels arranged in series so that the circulating liquid flows serially through all of the vessels in one zone before passing to the next zone in the loop.

4. A process according to claim 1 wherein each vessel is adapted for occasional transfer of the bed portion contained therein to a chamber for washing.

5. A process according to claim 4 wherein the top of each vessel may be brought into communication with an expansion chamber, whereby the bed portion may be backwashed into said expansion chamber and thereafter permitted to resettle into said vessel.

6. A process according to claim 1 wherein the position of the said front is predicted by monitoring the flow rate of the circulating liquid in the loop.

7. A process according to claim 6 wherein said monitoring is done at a single location in the loop, and the position of the front is predicted with reference to said flow rate adjusted to take account of the flow rates of the raffinate leaving the loop and the feed stream entering the loop.

8. A method for operating a simulated moving bed comprising:

flowing a fluid containing a sorbing component and a non-sorbing component in one direction along a bed packed with a solid sorbent with the upstream end and the downstream end interconnected to form a circulation loop;

maintaining circulation of fluid within said circulation loop with pump means located within said loop;

introducing a stream of feed stock and a stream of de-sorbent to the circulating fluid;

maintaining a front across the bed at the interface between distinct phases of the fluid within said loop;

withdrawing as separate streams an extract fraction and a raffinate fraction from the loop; and providing said bed in portions contained within a plurality of zones, said plurality corresponding to the total number of streams introduced to and withdrawn from said loop, each said zone containing at least one discrete vessel so that each bed portion may be removed without disturbing any other portion of said bed.

9. An improvement according to claim 8 wherein each vessel is adapted for occasional transfer of the bed portion contained therein to a chamber for washing.

10. An improvement according to claim 9 wherein the top of each vessel may be brought into communication with an expansion chamber, whereby the bed portion may be backwashed into said expansion chamber and thereafter permitted to resettle into said vessel.

11. An improvement according to claim 8 including four zones, each of which functions in sequence as a sorption zone, a displacement zone, an elution zone and a regeneration zone as the introduction of feed proceeds in steps to adjacent zones upstream in the loop and the introduction of eluant proceeds approximately simultaneously in the same steps to adjacent zones downstream in the loop, said step being timed in correspondence to the migration of a front between phases in the loop.

12. An improvement according to claim 8 including means in circuit with the vessels in said loop to provide a desired pressure head to each zone in the loop.

13. An improvement according to claim 12 wherein said means comprises individual booster pumps connected in series with said vessels.

14. An improvement according to claim 13 including a flow control means in said loop and means for detecting internally generated pressure of the loop across said flow control means, whereby to maintain said internally generated pressure approximately equal the total pressure drop across the loop.

15. An improvement according to claim 13 wherein the pressure at the suction sides of said booster pumps is monitored, and the sum of said pressures is maintained within a preselected range.

* * * * *